United States Patent
Chatelain et al.

(10) Patent No.: US 9,386,765 B1
(45) Date of Patent: Jul. 12, 2016

(54) REELED STRING DUCK DECOY

(71) Applicants: Justin P. Chatelain, Mansura, LA (US); Kirk Juneau, Mansura, LA (US)

(72) Inventors: Justin P. Chatelain, Mansura, LA (US); Kirk Juneau, Mansura, LA (US)

( * ) Notice: Subject to any disclaimer, the term of this patent is extended or adjusted under 35 U.S.C. 154(b) by 128 days.

(21) Appl. No.: 14/479,624

(22) Filed: Sep. 8, 2014

(51) Int. Cl.
*A01M 31/06* (2006.01)
*A01M 31/00* (2006.01)

(52) U.S. Cl.
CPC .............. *A01M 31/06* (2013.01); *A01M 31/008* (2013.01)

(58) Field of Classification Search
CPC ....................................................... A01M 31/06
See application file for complete search history.

(56) References Cited

U.S. PATENT DOCUMENTS

| | | | | |
|---|---|---|---|---|
| 3,888,032 A | * | 6/1975 | Gagnon | A01M 31/06 43/3 |
| 3,896,578 A | * | 7/1975 | Franceschini | A01M 31/06 43/3 |
| 4,827,653 A | | 5/1989 | Sewell | |
| 5,168,650 A | | 12/1992 | Martin | |
| 5,172,507 A | * | 12/1992 | Franceschini | A01M 31/06 43/3 |
| 6,487,811 B2 | | 12/2002 | Barrett | |
| 6,760,993 B2 | | 7/2004 | Lebens | |
| 2004/0010957 A1 | * | 1/2004 | Corbiere, Jr. | A01M 31/06 43/3 |
| 2006/0242883 A1 | * | 11/2006 | Tilby | A01M 31/06 43/3 |
| 2010/0011650 A1 | * | 1/2010 | Leonards, Sr. | A01M 31/06 43/3 |
| 2011/0239517 A1 | * | 10/2011 | Gazalski | A01M 31/06 43/3 |
| 2013/0014423 A1 | * | 1/2013 | Tonkovich | A01M 31/06 43/3 |
| 2014/0223798 A1 | * | 8/2014 | Paternostro | A01M 31/06 43/3 |
| 2015/0059229 A1 | * | 3/2015 | Miller | A01M 31/06 43/3 |

* cited by examiner

*Primary Examiner* — Gary Hoge
(74) *Attorney, Agent, or Firm* — Crossley & Stevenson Intellectual Property Law

(57) ABSTRACT

A reeled string duck decoy that provides an internally removable string reel via a gasketed removable panel, a decoy sealed against water invasion, a decoy that allows floatation height adjustment via an aperture with plug, allowing addition and subtraction of a material, a decoy that provides selective and varied attachment of a weight to the keel, and a decoy that provides a choice of either the head end facing winds and currents or having the tail end facing winds and currents.

3 Claims, 4 Drawing Sheets

REELED STRING DUCK DECOY

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of duck decoys are known in the prior art. Most of the existing decoys utilize a keel positioned below the duck body to have the duck substantially in line with current and winds. However, none provide for a choice in facing the decoy head into the wind or facing the decoy tail into the wind, yet the preference of each choice is important to many hunters. Some existing decoys provide only for facing the tail into a wind or current. Some existing decoys provide only for facing the decoy head into the wind or current. Some decoys provide a reel for string used to influence or anchor the decoy; however, a removable reel is not offered even though this the most likely a the decoy's features to fail. Also, a user may wish to alter the decoy's flotation level, yet this desire is not provided for. What is needed is a reeled string duck decoy that provides an internal string reel that is removable, a decoy that allows floatation height adjustment, and a decoy that provides for facing either the head end or tail end into winds and currents. The present reeled string duck decoy provides these advantages.

FIELD OF THE INVENTION

The present invention relates to a duck decoy, and more particularly, to a duck decoy that is sealable, a duck decoy that provides a reeled string, a decoy that provides for flotation height adjustment, a duck decoy that provides a string tied weight a removable string reel, and a decoy that provides for facing either the decoy head end or tail end into winds and currents.

SUMMARY OF THE INVENTION

The general purpose of the reeled string duck decoy, described subsequently in greater detail, is to provide a reeled string duck decoy that has many novel features that result in a reeled string duck decoy which is not anticipated, rendered obvious, suggested, or even implied by prior art, either alone or in combination thereof.

To accomplish this, the reeled string duck decoy comprises a plurality of varied duck bodies. The varied duck bodies enable a hunter to choose which types of ducks to be put out as decoys. Each duck body has a removable panel. A gasket seals the panel against foreign element invasion. Each duck body has a head end spaced apart from a tail end and a bottom side spaced apart from a top side. The removable panel is disposed in the top side to further ensure against potential water invasion. A keel is disposed on the bottom side, the keel extended from the head end toward tail end. A keel opening is disposed in the keel proximal the head end. The keel keeps the decoy floating in line with currents and with wind. A plurality of spaced apart hooks is disposed in the keel.

A tail end opening is disposed immediately adjacent the tail end at the top side. The tail end opening provides for temporarily fastening a plurality of the decoys together for more convenient transport and storage. The tail end opening is further used for any imaginable purpose, such as tethering the device, as example. As further example, using the tail end opening to tether the decoy could affect a tail end to the wind and currents attitude.

A flotation height adjustment aperture is disposed adjacent the tail end. A plug selectively disposed in the aperture. Importantly, the plug is removed to drain the duck body. Of equal importance is that the plug is also removed to add a water or an existing material to the duck body to affect a lower floatation level of the decoy. The water and material are also drained from the aperture as chosen. A foramen is disposed in the duck body, adjacent the bottom side and proximal the tail end. A seal disposed in the foramen. A hole is disposed centrally within the seal.

A mount is affixed to the removable panel within the duck body. A string reel is affixed to the mount. Of importance is that the removable panel accesses the string reel for replacement as needed. As the string reel is the most apt feature to fail over time, replaceability of the string reel ensures a long useful life for the decoy. A string is disposed on the string reel and sealably passed through the hole. Sealed passage of the string through the hole is an important feature of the decoy, as unwanted water invasion prevents adjustably desired floatation level of the decoy.

A weight having a length is disposed on an end of the string external the duck body. A plurality of spaced apart cavities is disposed along the length. The cavities are selectively installed on the hooks to hang the weight from the keel. The plurality of hooks is important in providing for a chosen varied attachment of the weight to the keel. The weight can be hung perpendicularly to the duck body. The weight can be hung parallel to the keel. The weight can be biased toward the head end or the tail end. These capabilities provide for floating the duck body exactly as a hunter wishes. The weight is also selectively free from the keel and used as chosen. The string is also selectively used free of the weight.

The string is also selectively passed through the keel opening. Of note is that having the tail end face the winds and currents may be accomplished via fastening the string to any chosen existing object. Also of note is that passing the string through the keel opening, then fastening to the existing object also determines whether the head end or tail end faces the currents and the winds. Passing the string through the keel opening affects a head end into the wind, as example. An angle of the duck body relative to biased flotation of the head and of the tail end is determined by any user's preference by biasing weight attachment more heavily toward the tail end or the head end.

Thus has been broadly outlined the more important features of the present reeled string duck decoy so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
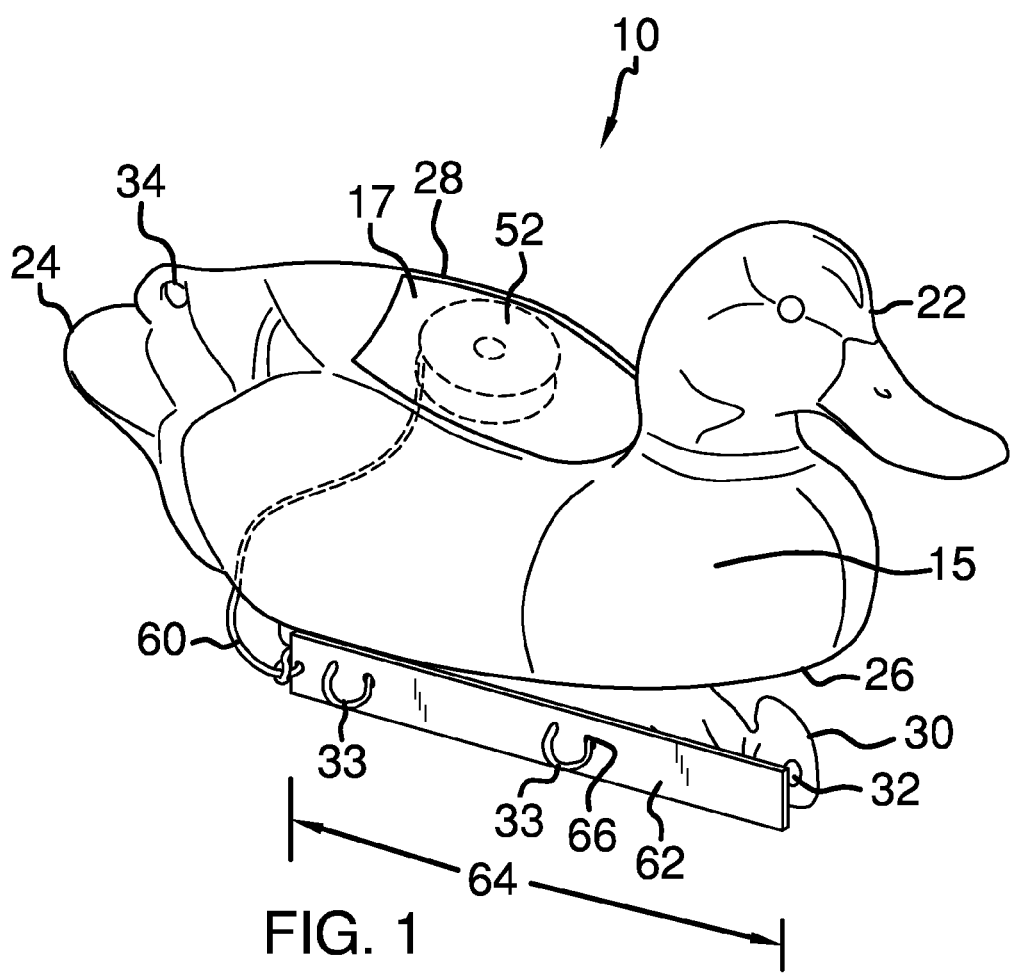
FIG. 1 is a top perspective view.
Figure 2:
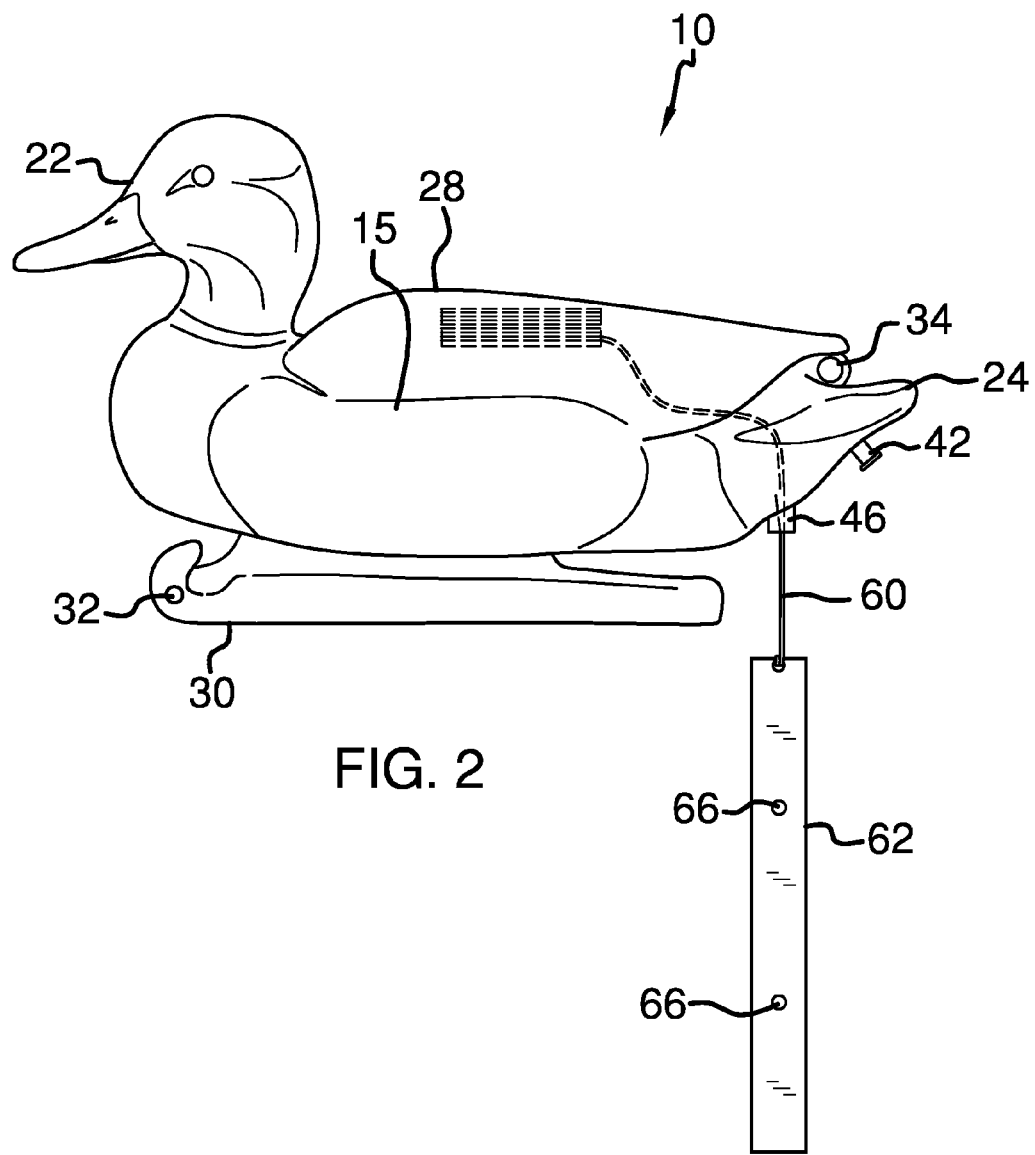
FIG. 2 is a lateral elevation view.
Figure 3:
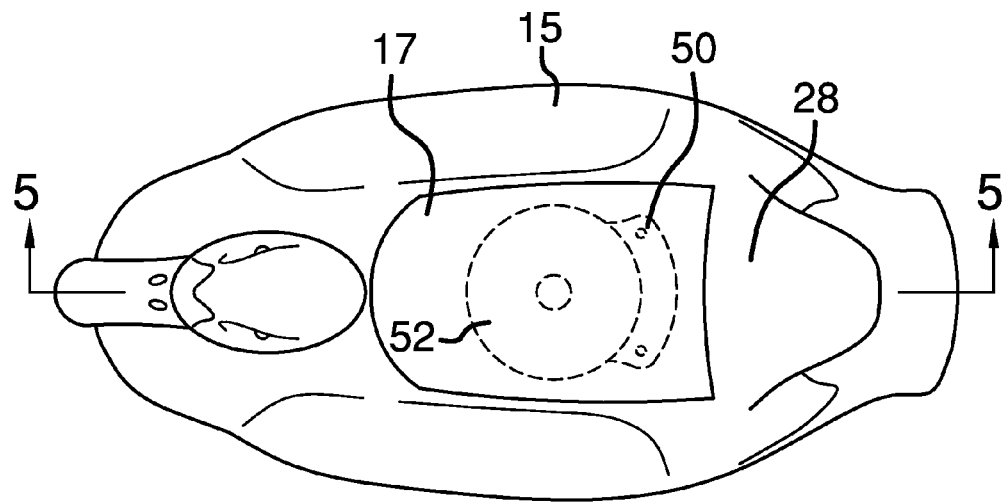
FIG. 3 is a top plan view.
Figure 4:
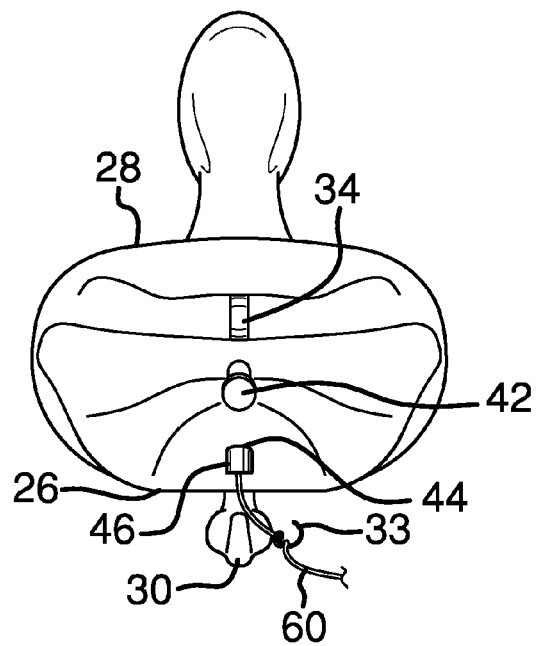
FIG. 4 is a tail end view.
Figure 5:
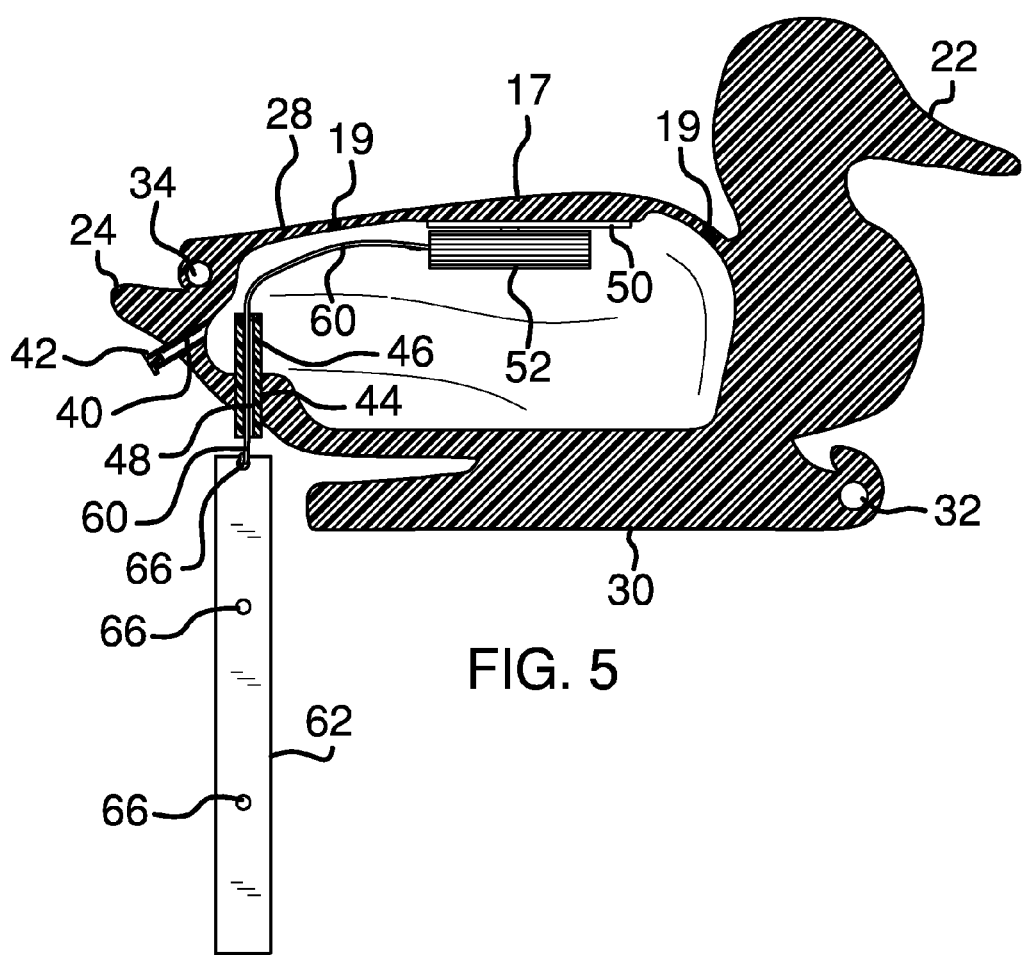
FIG. 5 is a lateral cross sectional view.

With reference now to the drawings, and in particular FIGS. 1 through 5 thereof, an example of the reeled string duck decoy employing the principles and concepts of the present reeled string duck decoy and generally designated by the reference number 10 will be described.

Referring to FIGS. 1 through 5, the reeled string duck decoy 10 comprises a plurality of varied duck bodies 15. The varied duck bodies 15 enable a hunter to choose which types of duck bodies 15 to be put out as decoys 10. Each duck body 15 has a removable panel 17. Each duck body 15 has a head end 22 spaced apart from a tail end 24 and a bottom side 26 spaced apart from a top side 28. The removable panel 17 is disposed in the top side 28. A gasket 19 seals the panel 17 to the top side 28 against foreign element invasion. A keel 30 is disposed on the bottom side 26. The keel 30 extends from the head end 22 toward tail end 24. A keel opening 32 is disposed in the keel 30 proximally even the head end 22. A tail end opening 34 is disposed immediately adjacent the tail end 24. A plurality of spaced apart hooks 33 is disposed in the keel 30.

A flotation height adjustment aperture 40 is disposed adjacent the tail end 24. A plug 42 selectively disposed in the flotation height adjustment aperture 40. A foramen 44 is disposed in the duck body 15, adjacent the bottom side 26 and proximal the tail end 24. A seal 46 is disposed in the foramen 44. A hole 48 is disposed centrally within the seal 46.

A mount 50 is affixed to the top side 28 within the duck body 15. A string 60 is disposed on a string reel 52 and sealably passed through the hole 48. The hole 48 and the string 60 are sealably related such that water does not flow into the duck body 15. A weight 62 having a length 64 is selectively disposed on an end of the string 60 external the duck body 15. A plurality of spaced apart cavities 66 is disposed in the weight 62. The weight 62 cavities 66 are selectively attached to the hooks 33 in any position desired by a user in influencing a posturing and attitude of the decoy.

What is claimed is:

1. A reeled string duck decoy comprising:
   a plurality of varied duck bodies, each duck body having a head end spaced apart from a tail end, a bottom side spaced apart from a top side;
   a keel disposed on the bottom side, the keel extended from the head end toward the tail end;
   a plurality of spaced apart hooks disposed in the keel;
   a foramen disposed in the duck body, adjacent the bottom side and proximal the tail end;
   a seal disposed in the foramen;
   a hole disposed centrally within the seal;
   a mount affixed to the top side within the duck body;
   a reel rotatably disposed on the mount;
   a string disposed on the string reel and sealably passed through the hole;
   a weight having a length selectively disposed on an end of the string external the duck body; and
   a plurality of spaced apart cavities disposed in the weight;
   wherein the cavities are selectively attached to the hooks in a desired positioning.

2. A reeled string duck decoy comprising:
   a plurality of varied duck bodies, each duck body having a head end spaced apart from a tail end, a bottom side spaced apart from a top side;
   a keel disposed on the bottom side, the keel extended from the head end toward the tail end;
   a keel opening disposed in the keel at the head end;
   a plurality of spaced apart hooks disposed in the keel;
   a tail end opening disposed immediately adjacent the tail end;
   a flotation height adjustment aperture disposed adjacent the tail end;
   a removable plug disposed in the aperture;
   wherein a material may be added to and taken from the duck body via the floatation height adjustment aperture in determining a floatation height of the duck body;
   a foramen disposed in the duck body, adjacent the bottom side and proximal the tail end;
   a seal disposed in the foramen;
   a hole disposed centrally within the seal;
   a mount affixed to the top side within the duck body;
   a reel rotatably disposed on the mount;
   a string disposed on the string reel and sealably passed through the hole;
   a weight having a length selectively disposed on an end of the string external the duck body; and
   a plurality of spaced apart cavities disposed in the weight;
   wherein the cavities are selectively attached to the hooks in a desired positioning.

3. A reeled string duck decoy comprising:
   a plurality of varied duck bodies, each duck body having a head end spaced apart from a tail end, a bottom side spaced apart from a top side;
   a removable panel disposed in the top side;
   a gasket disposed between the top side and the removable panel;
   a keel disposed on the bottom side, the keel extended from the head end toward the tail end;
   a keel opening disposed in the keel at the head end;
   a plurality of spaced apart hooks disposed in the keel;
   a tail end opening disposed immediately adjacent the tail end;
   a flotation height adjustment aperture disposed adjacent the tail end;
   a removable plug disposed in the aperture;
   a foramen disposed in the duck body, adjacent the bottom side and proximal the tail end;
   a seal disposed in the foramen;
   a hole disposed centrally within the seal;
   a mount affixed to the removable panel;
   a reel rotatably disposed on the mount;
   wherein the and disposed within the duck body;
   a string disposed on the string reel and sealably passed through the hole;
   a weight having a length selectively disposed on an end of the string external the duck body; and
   a plurality of spaced apart cavities disposed in the weight;
   wherein the cavities are selectively attached to the hooks in a desired positioning.

* * * * *